United States Patent [19]

Sandberg et al.

[11] 4,002,717
[45] Jan. 11, 1977

[54] REFINING OF MANGANESE OXIDE ORES

[75] Inventors: Richard G. Sandberg, Gloucester; William S. Kane, Wicomico; Paul H. Cardwell, Zanoni, all of Va.

[73] Assignee: Deepsea Ventures, Inc., Gloucester Point, Va.

[22] Filed: Jan. 9, 1975

[21] Appl. No.: 539,872

[52] U.S. Cl. .................. 423/24; 423/39; 423/41; 423/51; 423/139; 423/150; 423/568; 423/571; 423/605; 423/488; 75/101 R; 75/114; 75/115

[51] Int. Cl.$^2$ ............ B01D 11/04; B01F 1/00

[58] Field of Search ........... 75/121, 101 R, 101 BE, 75/114, 115, 24, 39, 41, 139, 568, 605; 423/49, 51, 52, 567, 571, 24, 40, 138, 39, 41, 139, 568, 605, 488; 204/105 M

[56] References Cited

UNITED STATES PATENTS

| 3,510,259 | 5/1970 | Everett | 75/115 |
|---|---|---|---|
| 3,809,624 | 5/1974 | Kane et al. | 204/105 M |
| 3,854,851 | 12/1974 | Cardwell et al. | 423/24 |

FOREIGN PATENTS OR APPLICATIONS

| 1,189,957 | 4/1970 | Canada | 75/120 |
| 44-661 | 1/1969 | Japan | 423/49 |

OTHER PUBLICATIONS

"Progress in Mineral Dressing," by G. Bjorling, Trans. of The International Mineral Dressing Congress, Stockholm, 1957, pp. 705-709.

*Primary Examiner*—R. L. Andrews
*Attorney, Agent, or Firm*—Barry G. Magidoff

[57] ABSTRACT

This invention provides a method for treating manganese oxide ores in an aqueous medium, with hydrogen halide or sulfuric acid, and a hydrogen sulfide or a metal sulfide, e.g. an ore. A leach liquor containing the desirable metal halides is then separated from the solid, insoluble residue. Any iron value in either the manganese oxide ore or in any metal sulfide ore present is not dissolved or is converted to an insoluble iron oxide. Elemental sulfur is also obtained.

The metal values in the leach liquor are recovered by crystallization of the manganese halide and liquid ion exchange extraction of the other metal values present.

34 Claims, 1 Drawing Figure

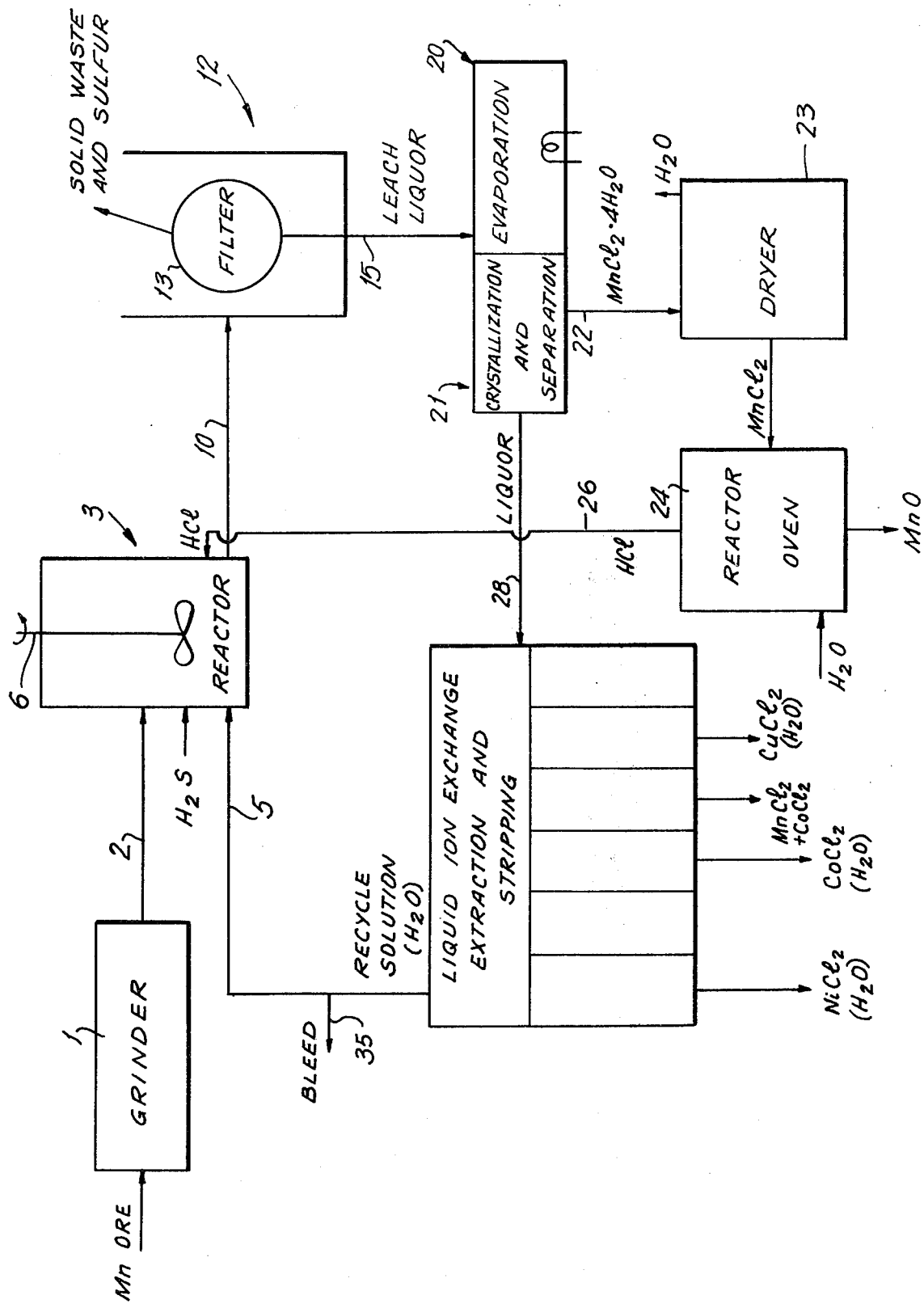

REFINING OF MANGANESE OXIDE ORES

This invention provides a new and highly efficient procedure for refining manganese oxide ores, which preferably contain metal values in addition to manganese, by forming an aqueous solution of a water-soluble salt of the metal values from the ore, from which solution the individual metal values can be readily obtained.

A variety of methods have been proposed and carried out for refining those manganese oxide ores wherein at least a major portion of the manganese is present in a combined valence state of greater than 2, i.e. 3, as in manganic oxide, or 4, as in manganese dioxide ($MnO_2$). Such procedures have generally included the conversion of the metal values to a water-soluble form so that they can be leached into an aqueous solution from the ore. Again, preferably, when other metal values are present together with the manganese, they are also so converted into a condition in which they can be obtained in their pure condition.

One procedure heretofore followed for treating such manganese oxide ores, has been halidation, for example, with hydrogen chloride, either in the anhydrous or in aqueous solution form. This procedure results in the formation of the water-soluble halides of the metal values, including manganese and, generally, iron, which is often present together with manganese, as well as other metal values which may have been present. These prior procedures presented several problems which increased the cost and complexity of these procedures, for example, reacting of hydrogen chloride in any form with, for example, manganese dioxide results not only in the formation of the desired manganese chloride, but also in the formation of elemental chlorine. A second problem involved the conversion of the iron to a soluble condition. In those ores where iron was present in a substantial quantity, for example, the ocean floor nodule ore, dissolved iron in the leach liquor presented a rather difficult problem in the subsequent refining procedures, thus increasing the cost of the refining procedure without any concomitant advantage. Generally, the iron so obtained following these procedures was not economically useful for other purposes. Such halidation procedures have previously been disclosed for example, in U.S. Pat. No. 3,752,745, where the treatment of the ocean floor manganese nodules with anhydrous hydrogen chloride is disclosed. U.S. Pat. No. 3,578,394, to Palmer, generally discloses the treatment of manganese dioxide ore with hydrochloric acid. The use of hydrochloric acid has been disclosed generally for the halidation of a variety of ores, for example, the iron nickel ore treatment with aqueous hydrogen chloride disclosed by Graham et al, U.S. Pat. No. 2,766,115.

Manganese ores have also been treated so as to form the water-soluble sulfates of the metal values in the ore, then leached to form an aqueous solution thereof, for example, the manganese ore has been reacted with sulfur dioxide in the anhydrous or in the aqueous form, as disclosed for example, in German Offenlegungsschrift No. 1,533,117, published Jan. 2, 1970, or in U.S. Pat. No. 3,810,827, to Kane et al, or in U.S. Application Ser. No. 310,604, dated Nov. 29, 1972, now U.S. Pat. No. 3,869,360. It has also been suggested that an ocean floor manganese nodule ore, i.e., one containing manganese dioxide, be reacted with anhydrous sulfur dioxide in the absence of oxygen, followed by leaching to remove substantially pure manganese sulfate, substantially without any of the other metal values. See U.S. Pat. No. 3,810,827. Sulfatization of manganese ore has also been carried out by roasting the manganese ore in combination with iron sulfide ore followed by leaching to remove the desirable metal sulfates. The advantage of this treatment had been that manganese is substantially completely obtained from the ore whereas the iron value present in the manganese ore and in the iron sulfide is not solubilized but remains, apparently, in the insoluble oxide form. This eliminates the necessity of subsequently separating the soluble iron from manganese in the leach solution.

The present invention provides a simple, straight-forward method for obtaining soluble manganese salt from a high valence manganese oxide ore without solubilizing iron and simultaneously, if desired, refining a metal sulfide ore. In addition, the present process is carried out at relatively low temperatures and in an aqueous system so as to directly form the desirable leach solution without requiring a two-stage procedure of initially reacting the ore followed by subsequent leaching with water.

In accordance with the present invention, there is provided a process for the refining of manganese oxide ores, the ores comprising manganese in a valence state greater than 2, the process comprising admixing the manganese oxide ore with a sulfide compound selected from the group consisting of hydrogen sulfide and a metal sulfide, and an acid, preferably a hydrogen halide selected from the group consisting of hydrogen chloride, hydrogen bromide, and hydrogen iodide, to form elemental sulfur and an aqueous leach solution comprising dissolved manganese halide.

In addition to utilizing hydrogen halides, specifically hydrogen chloride, hydrogen bromide and hydrogen iodide, in accordance with the present procedure, other acids can also be utilized in substitution therefor. In the present procedure, the hydrogen halide is not utilized for its reducing activity; this function is taken over by the sulfide material. The hydrogen halide is utilized solely for its acidic properties, reacting to form metal halides of the metals present. Accordingly, in addition to using hydrogen halides, sulfuric acid, for example, can be wholly or partially substituted therefor. The reaction proceeds in substantially an identical manner to that obtained when utilizing hydrogen halide, with the exception that the salts formed are the water-soluble metal sulfates, in lieu of the water-soluble metal halides. In all other respects, the same procedures can be followed.

Preferably, the process is carried out at a temperature of at least about 80° C up to the boiling point of the aqueous medium. Generally, it is most preferred to carry out the process at or near the boiling point of the aqueous medium.

The economic advantage of the present process is enhanced when the sulfide compound is a metal sulfide ore, whereby the metal values of not only the manganese oxide ore are obtained in the aqueous leach solution, but also the metal values of the metal sulfide ore. Other metal sulfide compounds, either in the pure state, the mixed state or the semi-refined state can be utilized as desired or as available.

For example, useful metal sulfide ores include pyrrhotite ($Fe_xS_y$, e.g. $Fe_8S_9$), chalcocite ($Cu_2S$), galena (PbS), sphalerite (ZnS), cobaltite ([Co,Fe]AsS), pentlandite ($[Fe,Ni]_9S_8$), chalcopyrite ($CuFeS_2$), covellite (CuS). It must be pointed out that not all sulfite compounds are operative for the present invention; generally only those sulfide compounds which will react in accordance with the procedure set forth above and in accordance with the specific reactions disclosed below are included within the scope of the present claims. It is known for example, that compounds which are polysulfides, i.e., those that contain an S-S bond, for example such as that present in iron pyrite, are inert. It is pointed out further, however, that by suitable treatment, such inert polysulfide materials, can be converted to the active sulfide compounds and they can then be utilized in the present invention. Furthermore, the presence of these polysulfide linkages in an ore, or in a mixture of compounds, has substantially no effect on the course of the present procedure; as long as there is a metal sulfide present in the reaction material which is not a polysulfide, the reaction will proceed and the presence of the polysulfide will have substantially no effect. The reason why the polysulfides do not work, and, in fact, the exact structure of these polysulfides, is not clearly understood; however, it is not believed that further explanation is necessary in order to carry out the present invention.

The compounds listed above for the metal sulfide ores are the primary metal sulfide compounds which are present in the ore. However, these ores are generally admixtures of a variety of materials, including insoluble detritus, or gangue, which remains behind and is readily separated from the leach solution.

The manganese oxide ores encompass oxide ores which contain manganese having a valence of at least 3 and preferably 3 or 4, or a compound of manganese which when heated is converted to such an oxide. Manganese having a lower valence can also be present without affecting the reaction of the higher valence manganese with the sulfide and acid. Such ores include the ocean floor manganese nodule ore, as well as such terrestrial ores as pyrolusite and manganite which contain $MnO_2$ and $Mn_2O_3$.

The exact mechanism of the reaction in accordance with the present procedure, which takes place when the manganese oxide ore is admixed with the sulfide and acid, is not fully understood; the mechanism is not necessary to a description of the present invention. The presence of the sulfide, together with the acid, especially at temperatures above at least about 80° C, results in the reaction with the manganese oxide ore to form elemental sulfur. Preferably there is a stoichiometric amount of each reagent present in the reaction mixture.

When utilizing a meta sulfide material, e.g. a pure metal sulfide compound or a metal sulfide ore, the metal sulfide is preferably first admixed with the manganese oxide ore in water, followed by the passage of the gaseous hydrogen halide into the aqueous slurry mixture. It is noted that a great excess of the hydrogen halide reactant is, of course, wasteful and should be avoided. It is not desired to solubilize any iron that may be present in either the manganese ore, or in the sulfide material.

It must be, of course, pointed out that in the various ores that can be used in the process, whether the sulfide ores or the manganese oxide ores, there is some undesirable basic material present, such as oxides or carbonates of alkali metals or alkaline earth metals, which preferentially react with any acid, i.e., hydrogen halides, that may be fed; thus, in computing the stoichiometric amount of the hydrogen halide which must be added, the quantities of these materials which are present must be considered.

Under certain circumstances, it may be advisable to pretreat the manganese oxide ore with a material which will react with the undesirable basic materials in the ores, thus neutralizing and removing these materials from the ore prior to the reaction of this invention.

The precise reactions which occur during the course of this process are dependent upon the compositions of the various materials, e.g. the manganese oxide ore and the sulfide utilized, as well as the relative proportions of the acid, sulfide, and manganese oxides which are present. For example, when reacting a manganese dioxide-containing ore, such as ocean floor nodule ore, the following reactions can occur utilizing different sulfide compounds:

$14HCl + 5MnO_2 + 2CuFeS_2 \rightarrow 5MnCl_2 + 2CuCl_2 + Fe_2O_3 + 4S + 7H_2O$   1

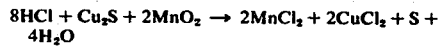

$8HCl + Cu_2S + 2MnO_2 \rightarrow 2MnCl_2 + 2CuCl_2 + S + 4H_2O$   2

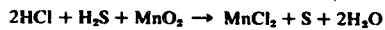

$2HCl + H_2S + MnO_2 \rightarrow MnCl_2 + S + 2H_2O$   3

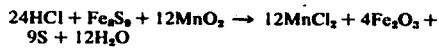

$24HCl + Fe_9S_9 + 12MnO_2 \rightarrow 12MnCl_2 + 4Fe_2O_3 + 9S + 12H_2O$   4

Referring to the above equations, reactions 1 and 2 utilize a copper ore, specifically chalcopyrite and chalcocite, respectively, as the sulfide material. In the reactions defined by equations 1 and 2 above, the reaction product includes, in both cases, cupric chloride. It is possible, for example, by changing the ratio between the sulfide and the manganese oxide reagents, to form different products, in this case, specifically, a copper product having a different valence, e.g. cuprous chloride. For example:

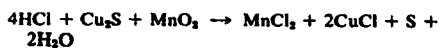

$4HCl + Cu_2S + MnO_2 \rightarrow MnCl_2 + 2CuCl + S + 2H_2O$   5

$10HCl + 4MnO_2 + 2CuFeS_2 \rightarrow 4MnCl_2 + 2CuCl + Fe_2O_3 + 4S + 5H_2O$   6

A comparison between equations 1 and 2 above and equations 5 and 6 above, show the effect of varying the proportions of the manganese oxide ore (which is an oxidizing agent) and the sulfide (which is a reducing agent). The opposing effects of oxidation and reduction are made evident when the proportions of the two reagents are changed and valence state of the metal product changes accordingly. Reactions 3 and 4 above, exemplify the use of hydrogen sulfide and an iron sulfide ore (pyrrhotite).

The procedure can also be carried out using a material which is a mixture of a normal, or reactive, sulfide ore plus a polysulfide material. For example, as follows:

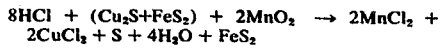

$8HCl + (Cu_2S + FeS_2) + 2MnO_2 \rightarrow 2MnCl_2 + 2CuCl_2 + S + 4H_2O + FeS_2$   7

As noted, the material utilized above is an ore which includes both types of sulfides, i.e., chalcocite and pyrite. As shown, the reaction results in the conversion of that proportion of the material which is an active sulfide to the oxide and the elemental sulfur. The remaining material is retained as the inert polysulfide.

The unusual aspect of the present procedure resides in the manner in which the manganese oxide reacts with the acid, e.g. hydrogen halide, and the sulfide material. specifically, the reaction avoids the formation of the elemental halogen, and results in the formation of elemental sulfur. The iron material which is usually present in such manganese oxide ores and in the sulfide ore, if used, is converted to, or is maintained as, the water-insoluble oxide, and is not converted to the water-soluble salt as would occur when reacting the ore with a hydrogen halide, or sulfuric acid alone. The remaining metal values in the manganese oxide ores, for example the other heavy metals that are generally present together with manganese, such as nickel, cobalt, copper and zinc, are also converted to water-soluble salts.

As pointed out above, although the exact mechanism by which this reaction occurs is not fully understood, it is believed that the manganese oxide ore or the sulfide ore, or the acid solution, when hydrogen sulfide is used, should contain at least iron or copper in order for the preferred reaction to proceed in the desired manner. Generally, the other metal values, other than the manganese and iron, react in their usual manner with the hydrogen halide. For example, reactions between copper and nickel oxides with the HCl proceed as follows:

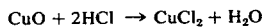
$$CuO + 2HCl \rightarrow CuCl_2 + H_2O \qquad 8$$

$$NiO + 2HCl \rightarrow NiCl_2 + H_2O \qquad 9$$

The reaction of the present invention is preferably carried out at a temperature of above at least about 80° preferably above about 95° C, and most preferably at, or as close as possible to, the boiling point of the liquid in the slurry. It has been found that at temperatures below about 80° C, the direct reaction of manganese oxide and the hydrogen halide does proceed to at least a limited extent in the presence of the sulfide, and thus the desired effect of the present invention is not as fully obtained.

The sulfide compounds which can be utilized, include hydrogen sulfide or any metal sulfide compound, or mixed compound, or mixture of compounds, except, as stated above, the polysulfide compounds of the various metals. It is preferred of course, to utilize a sulfide of a metal which is itself of value and which itself will thus contribute to the value of the products obtained: e.g., CuS.

The solid metal sulfides and the manganese oxide ore are preferably in fine particulate form, thus, such ores are preferably initially comminuted; the comminuted solid material is then slurried in water to form the desired aqueous slurry, the temperature of the slurry is increased to at least about 80° C, following which the acid, e.g. hydrogen halide, is passed therethrough. Preferably, the particle size of the solid material in the slurry is not greater than about 10 mesh, in order to obtain the desired slurrying effect and the desired rate of reaction. Further, the slurry is preferably continuously agitated, so as to maintain the solids in suspension, thus further maintaining the desired reaction rate by maintaining as large a surface area as possible exposed to the hydrogen halide reagent.

-When utilizing a gaseous hydrogen sulfide as the sulfide reagent, the sulfide and the acid, e.g. hydrogen halide, are preferably simultaneously passed into the slurry comprising the ore particles; care should be taken that the relative amounts of hydrogen sulfide and the acid being passed is maintained such that there is always at least a stoichiometric amount of the hydrogen sulfide and of the acid to react with the manganese oxide ore.

The metal salt, e.g. metal halide, reaction products go into solution in the slurrying liquid; the insoluble solids include any iron, as iron oxide, as well as the detritus or gangue material; the detritus generally includes, for example, silicates, which are often present in the manganese oxide ore as well as in the sulfide ore, if used. There is also formed water-insoluble elemental sulfur, also suspended in the aqueous liquid.

The aqueous liquid which is initially slurried together with the manganese oxide ore, can itself be a solution of a hydrogen halide, or other acid, as long as the sulfide material is also present at that time, to prevent the formation of elemental halogen and of ferric salt, from any iron that may be present in the ore. Additional acid, e.g. hydrogen chloride or sulfuric acid, (or $SO_3$) can then be added to the aqueous liquid.

Following completion of the reaction, the insoluble solids are separated from the aqueous leach solution. The resulting leach solution preferably has a pH of not greater than about 3.5 in order to maintain all of the desired halides in solution; optimally, a leach solution having a pH of not more than about 2 is obtained.

The separation of the leach solution from the ore solids can be by any desirable procedure, either now known or to be developed in the future. The sulfur in its elemental form can be separated also by any desirable method, such as flotation, or by extraction in an organic solvent such as an organic halide. The sulfur extraction is preferably carried out hot and, upon cooling, the sulfur can be crystallized from the organic solvent. The sulfur itself can, if desired, be removed from the process and independently utilized or sold, or it can be converted to hydrogen sulfide, again by any desired method now known, or to be developed in the future, and recycled into the present system. Such conversion to hydrogen sulfide, for example, can be carried out by reaction with natural gas and water.

The aqueous leach solution obtained from this process has an initial temperature, as pointed out above, of at least about 80° C and preferably of at least about 95° C or even higher. The reaction itself, is extremely fast and exothermic, and thus additional heat is generally not needed once the reaction is initiated. The aqueous leach solution contains the salts of manganese and of any other metals which form soluble halides or, soluble sulfates and which were present in either the manganese oxide ore or in the sulfide material.

The total amount of water present in the leaching solution is preferably enough to dissolve substantially all of the metal halides in the ore; most preferably, a concentrated solution of manganese halide is obtained, optimally as close to saturation as possible, at the initial temperature of the leach solution.

Generally, in the type of ores to be treated by this procedure, the relative amounts of manganese and other desirable metal values are such that a leach solution can be obtained which is substantially saturated in manganese halide, at the reaction temperature, but which is not saturated in the other desirable metal halides at either the reaction temperature, or at the lower temperatures to which the leach solution is to be cooled, e.g. ambient temperatures.

Although the hot, leach solution is optimally as close to saturation as possible in the manganese halide, more generally the concentration of manganese halide should be such that at least about 20%, and preferably at least about 50%, of the manganese halide crystallizes out at the temperature to which it is to be cooled. The maximum concentration of the manganese halide in the hot, leach solution is further limited so that, as stated above, the other metal salts do not crystallize out when this solution is cooled. The hot, leach solution is preferably cooled to a temperature not greater than about 60° C, and most preferably not greater than about 30° C, and optimally substantially to ambient temperature, to cause the crystallization of a substantial portion of the manganese halide originally in the hot leach solution. The crystallized manganese halide, is then readily separated out from the remaining aqueous liquor. The unusually steep temperature-solubility curve of manganese halide in water makes this procedure possible, enabling the separation of a substantial portion of the manganese halide from other metal values present in the ores.

Where the concentration of the manganese halide in the hot leach solution is not great enough, the leach solution can be partially evaporated to increase the concentration of the metal salt to the desired value, before cooling.

A portion of the manganese halide does remain behind in the cooled, leach solution, together with the other metal halides which have been dissolved. The cooled, leach solution, is then preferably further treated to selectively extract at least one of the other metal halides that have been dissolved. Preferably, such other metal is selectively removed, utilizing liquid-liquid extraction, especially liquid ion exchange extraction.

Alternatively, when the concentration of the manganese halide in the leach liquor is insufficient to be crystallized out when cooled, the other metal halides are extracted, and the remaining manganese halide is then separated out by crystallization during evaporation of the remaining water.

When the other metal values have been removed, there remains a solution which contains either all or only part of the original manganese halide obtained from the ore, in accordance with the above set forth reactions. Such a solution generally also contains compounds such as the halides of the alkali metals which are usually present in the manganese ores. The presence of such materials is not necessarily detrimental to further treatment to obtain pure metallic manganese. For example, if the manganous halide is crystallized out by evaporation, many of these alkali metal halides, if desired, can be crystallized out with it.

Manganese halide can generally be readily converted to the oxide by reaction with water at temperatures in the range of from about 400° to about 700° C, and preferably about 500° C to about 600° C. The crystallized manganous halide obtained from the leach liquor, either initially or subsequent to the removal of the other metal values, is generally in the form of the tetrahydrate; this compound, without the addition of further water, can react with its own water of hydration to form manganous oxide, and vaporous hydrogen halide. Preferably, it is desirable to convert the manganese chloride tetrahydrate to the anhydrous salt prior to conversion to the oxide by reaction with added water. The hydrogen halide formed by the conversion of the manganous halide to manganous oxide can then be recycled for use in the initial reaction with the manganese oxide ore and the sulfide material.

When the leach solution does contain other valuable metals in addition to manganese, these metals can be separated to obtain individual streams of such separate metal values. For example, copper, cobalt and nickel values, would be obtained from ocean floor nodule ores. A liquid ion exchange extraction procedure has been found to be the most preferred method of obtaining individual streams of these metals. If desired, of course, other procedures can be utilized for separating out the various metal values.

The individual metal values can each be extracted, utilizing an extracting agent which is selective to remove the desired metal value from an aqueous solution containing the other metal values, formed during the halidation of the nodule ore. The metal value is preferably readily stripped from the extracting agent. The individual metal value, as extracted out and then stripped from the extracting agent, can then be converted if desired, to the elemental metal by various conventional reduction methods.

The extracting medium is preferably a liquid, which is optimally immiscible with water, i.e., the aqueous leach solution. The most preferred extraction agents are liquid ion exchange materials. These, in general, are chelating agents which extract the desired metal value without regard to the particular anion with which it is present in solution.

The extracting medium should be immiscible with water to improve the economic efficiency of the process. If the extracting medium were not immiscible with water, a substantial loss of the extracting agent would occur during each extraction by virtue of at least a partial solubility in the water phase, resulting in a loss of the extracting agent to the aqueous raffinate. Suitable extracting agents are highly specific to metal values in the leach solutions, for example, from ocen floor nodule ores which contain dissolved manganese, nickel, copper and cobalt values or from sulfide materials containing similar metals. For example, the hydrocarbyl-substituted-8-hydroxyquinolines, and the alpha-hydroxyoximes, are useful extracting agents, regardless of the reactant acid used, e.g. a hydrogen halide or sulfuric acid. The preferred 8-hydroxyquinoline compounds are those which are at least substituted with the hydrocarbyl group in the 7-position, i.e., the 7-hydrocarbyl-substituted-8-hydroxyquinolines. Examples of the preferred 8-hydroxyquinoline and alpha-hydroxyoxime extracting agents and a more complete definition of their scope are set forth in commonly owned U.S. Application, Ser. No. 247,693, now U.S. Pat. No. 3,854,851, or in German Offenlegungsschrift 2,320,881, published on Nov. 15, 1973, which are herein incorporated by reference. As is further explained in the above incorporated references, the above-named preferred extracting agents are generally utilized in solution with a water-immiscible solvent, for example, an inert hydrocarbon liquid. The definitions of the solvent materials, and the manner in which they are utilized and obtained are also set forth in the above incorporated references, and these portions of the references are also incorporated herein.

When a hydrogen halide solution is used as the acid reactant, especially hydrogen chloride, with nodule ore and a sulfide material to form a leach solution of the metal halides, e.g. metal chlorides, the cobalt halide can be selectively extracted from the solution containing nickel halide and manganese halide (after the copper has been removed), using secondary, tertiary and quaternary hydrocarbyl amines, and most preferably trialiphatic amines, optimally trialkyl amines.

For a more complete exposition on the scope of the amines, a list of examples, suitable solvents, and parameters for use: German Offenlegungsschrift No. 2,320,880, published Oct. 31, 1973.

The drawing is a schematic diagram of one preferred embodiment of a procedure carried out in accordance with the process of the present invention; the schematic procedures shown in the drawing and in the following examples are intended to be only exemplary of the present invention, and are not intended to limit the scope thereof, which encompasses the procedures as broadly defined above, and all equivalents thereof.

In the drawing, and in the following description of the process depicted therein, the elements of the apparatus utilized in the process are shown and described in generally an essentially symbolic manner. Appropriate structural details for actual operation are readily known and understood to those skilled in the art, and need not be set forth herein, as they are not part of the present invention. Generally, all process vessels and fluid conduits, unless otherwise specified, are made in accordance with conventional practice as now, or in the future to be conducted. Any equivalents of the particular apparatus or procedures depicted herein are, of course, included within the scope of the present invention.

Referring to the drawing, a manganese oxide ore, e.g. an ocean floor nodule ore, is comminuted in a crusher-grinder 1, to a particle size of not greater than about 50 mesh, U.S. Sieve Scale. The crushed ore then passes via conduit 2, into the reactor vessel, generally indicated by the numeral 3, where it is admixed with an aqueous recycle solution entering via conduit 5, to form a suspension, or slurry. The slurry is continuously agitated, using agitator 6. Gaseous hydrogen sulfide ($H_2S$) and hydrogen chloride (HCl) are admitted at the bottom of the vessel to pass upwardly through the aqueous slurry within the reactor vessel 3. The reactor vessel is maintained at a temperature of about 100° C, i.e., slightly below the boiling point of the aqueous solution therein formed. The slurry mixture is continuously tapped and removed from the vessel 3, to pass through a filtration unit generally indicated by the numeral 12, including a drum filter, 13. The clear, leach liquor passes into the interior of the drum filter from which it is removed via line 15, and passed to an evaporation unit, generally indicated by the numeral 20. The solid material present in the slurry, is removed from the separation unit 12, and includes the gangue and detritus material, including the iron value from the ore, and the sulfur. The sulfur can then be readily separated from the other solid waste by leaching with a hot hydrocarbon solvent, from which the sulfur can then be crystallized and separated by conventional means.

The hot, leach liquor is at least partially evaporated to remove sufficient water to form a substantially saturated solution of manganous halide; the liquid is then passed to a cooling and separation chamber, generally indicated by the numeral 21, in which the hot, leach liquor is cooled to a temperature of about 30° C, and the crystalized manganous halide, e.g. $MnCl_2 \cdot 4H_2O$, is removed via line 22. The manganese halide tetrahydrate is then heated in the drier 23, to a temperature of at least about 190° C to form anhydrous manganese halide and water. The anhydrous manganese is reacted with steam in the reactor oven 24 at least at about 550° C, to form manganous oxide and hydrogen halide. The hydrogen halide, e.g. HCl, which is formed in the reactor oven, 24, is passed overhead through conduit 26, and recycled to the reactor vessel, 3.

The cooled, leach liquor from the crystallization and separation unit, 21, is then passed to a liquid ion exchange extraction and stripping system in order to obtain separate aqueous solutions of cupric sulfate, nickel chloride and cobalt chloride in accordance with the following procedure. The leach liquor entering the liquid ion exchange system from conduit 28 is at a pH of approximately 2. This liquor is first contacted with a water-immiscible solution of either an alpha-hydroxyoxime or a hydrocarbon-substituted-8-hydroxyquinoline dissolved in an organic medium which is immiscible with the aqueous leach solution. As is explained in the incorporated references, the contact can be in a single or multiple stages and by batch or continuous operation. The extraction medium containing the copper is then separated from the aqueous solution and the copper can be stripped, as copper sulfate, for example, from the copper-containing extraction medium, using an aqueous sulfuric acid solution having a hydrogen ion concentration in an amount to provide at least 5% excess of hydrogen ion over the stoichiometric amount required to substitute for the copper in the extracting agent.

The aqueous, copper-free raffinate is then contacted with a water-immiscible solution of, preferably a trialkylamine, in order to extract cobalt, which can be readily stripped from the amine using water. A minor proportion of the manganese value is extracted together with the cobalt. The manganese can be separated by initially stripping with, e.g., a saturated aqueous solution of NaCl, to strip out most of the manganese, stripping out the cobalt together with the remaining manganese using water having a pH of from about 2 to 6 to form a cobalt strip solution, followed by subsequent selective separation of the manganese from the strip solution using, e.g., an organic phosphate diester, in accordance with the German Offenlegungsschrift No. 2,320,880, supra, to leave a substantially pure aqueous cobalt solution.

The aqueous cobalt-free raffinate is then admixed with a base, e.g. sodium hydroxide, to increase the pH to at least about 4.0, and then contacted with a solution of a liquid ion exchange agent, e.g. an alpha hydroxyoxime, or a 7-hydrocarbyl-substituted-hydroxyquinoline, in a water-immiscible hydrocarbon solvent, in order to extract nickel. During the nickel extractions, the pH of the liquid is kept within the desired range of pH 4.0 to 4.5 by the addition of base, e.g. sodium hydroxide.

The extract medium, containing the nickel value is preferably selectively stripped of its nickel content by the use of an acid stripping liquid, e.g. hydrochloric acid solution, containing hydrogen ion, in an amount sufficient to replace all of the nickel held by the extracting agent. The nickel thus stripped, is treated in an electroplating cell in order to obtain the elemental nickel.

The final raffinate aqueous solution, substantially free from copper, cobalt and nickel, but which contains the remaining proportion of the manganese halide not crystallized earlier in the process, is then recycled to the reactor vessel to serve as the slurry liquid via conduit 5. In order to prevent the buildup of the various non-extracted metals in the solution, particularly any alkaline earth metals or alkali metals that may have been present in the original ores, as well as that added by the base during the extraction procedures themselves, a proportion of the recycled solution is bled off through line 35, prior to being recycled to the reactor.

The following working examples are preferred embodiments of procedures carried out in accordance with the process of the present invention, but are not exclusive of the full range of this invention.

Although the process in accordance with the present reaction can be carried out with any type of manganese ore, regardless of its characteristics and composition, this process is especially useful for the unique type of ore, known as the ocean floor nodule ore. Such nodules are formed as an extremely complex crystal matrix of iron and manganese oxides: tiny grains of each oxide of a size and type which are substantially impossible to separate with presently available physical means. These iron and manganese oxides form the crystal structure within which are held, by means not precisely known, other metal compounds most likely oxides, including those of nickel, copper and cobalt. There is also a large quantity of silt, or gangue, material intimately admixed in the nodule ore. The silt, or gangue, is sand and clay, and includes the oxides of silicon and aluminum in varying proportions. The precise chemical composition of these nodule ores varies with their location on the ocean floor. However, generally, the more valuable ores of whatever type, comprise primary quantities of manganese and iron generally in a ratio by weight of manganese-to-iron of at least about 5-to-1.

EXAMPLE 1

A sample of ocean floor nodule ore (manganese oxide ore which contains 27.6% manganese, 1.25% nickel, 6.00% iron, 1.07% copper and 0.25% cobalt, all by weight based upon the metal values present, is ground to a particle size of less than 30 mesh. A sample of the ground ore, 350 lbs., dry weight, is added to a reactor containing 85 gallons of water and the mixture stirred while being heated to a temperature of about 90°–95° C. At this temperature, 160 lbs. anhydrous gaseous HCl, and 59 lbs. gaseous hydrogen sulfide are simultaneously fed to a bottom portion of the slurry mixture during a period of 108 minutes. The temperature during this time was maintained at 90°–95° C without the requirement of additional heating, but with continuous mixing.

Following the end of 108 minutes, the mixture is filtered to separate the final leach solution from the solid ore residue and solid elemental sulfur formed during the reaction.

A sample of the leach solution, weighing 10 grams, was analysed and found to contain:
  0.88 grams manganese
  0.033 grams copper
  0.048 grams nickel
  0.0046 grams cobalt The leach liquid was found to be substantially free of iron. Thus 95% of the manganese, 31% of the copper, 92% of the cobalt, and 78% of the nickel values, by weight of the metal present in the nodule ore, had been converted to their water-soluble chlorides and dissolved in the leach liquor.

The leach solution is then passed to an evaporation chamber where it is heated to a temperature of 110° C, and permitted to evaporate to the point where, upon cooling to 30° C half of the dissolved manganese chloride crystallizes. The crystallized manganese chloride is then separated from the remaining liquor, the crystals, primarily manganese chloride tetrahydrate, are then dried in a drying oven to the anhydrous salt. The anhydrous salt is then contacted with steam in an oven at a temperature of about 550° C to form manganese oxide and hydrogen chloride. Hydrogen chloride is removed overhead.

The leach liquor having a pH of about 2, is next passed to a liquid ion exchange unit to initially extract the copper value. The pregnant leach liquor is contacted with an extracting medium comprising 3% by weight, 7-[3-(5,5,7,7-tetramethyl-1-octenyl)]-8-hydroxyquinoline, in an 85% Napoleum hydrocarbon solvent and 12% nonylphenol in a 3-stage, countercurrent mixer-settler system at a volume ratio of organic-to-aqueous phases of 2:1 to remove copper. The organic extract phase is stripped with the sulfuric acid solution generated in an aqueous copper sulfate electrolysis operation in a countercurrent, 3-stage mixer-settler system. The regenerated extracting medium is recycled and contacted with additional leach liquor.

The pH of the aqueous raffinate from the copper extraction step is adjusted to about 3.5 by the addition of 2N caustic solution, and then contacted countercurrently with a solution containing 25% by volume of tri-isooctylamine in aromatic solvent, in a 4-stage, countercurrent mixer-settler system. The aqueous-to organic volume ratio in the extraction system was 1:2. The organic phase amine extract contains substantially all of the cobalt from the aqueous solution plus a minor proportion of the manganese originally present.

The amine phase is next contacted with an aqueous stripping solution containing 3N NaCl in a three-stage mixer-settler system, with an aqueous-to-organic volume ratio of 1:5 to preliminarily strip most of the manganese from the extract solution. The organic phase from the stripping procedure, containing some of the manganese and most of the originally extracted cobalt, is then contacted countercurrently with an aqueous acid solution having a pH of 2 in a three-stage mixer-settler system at an aqueous-to-organic volume ratio of 1:5, to strip out the remaining cobalt chloride and manganese chloride into a final aqueous strip solution.

The pH of the final strip solution is adjusted to about 3 by the addition of 2N sodium hydroxide and contacted countercurrently with a 10% by volume solution of di-(2-ethylhexyl)phosphoric acid in kerosene with 10% by volume isodencanol, in a 2-stage mixer-settler system to extract the remaining manganese; pH is maintained at about 3, with a caustic solution. The organic extract containing the manganese is then countercurrently stripped through two mixer-settler stages with a dilute aqueous hydrochloric acid solution having a pH of 1. The aqueous strip solution remains, which is substantially pure cobalt chloride solution.

The concentration of the cobalt in the aqueous strip solution can be increased by re-extracting the cobalt from the weakly acidic aqueous solution using a liquid ion exchange agent, for example a dialkyl phosphoric acid, e.g. di-(2-ethylhexyl)phosphoric acid, in a solution of 10 volume percent in kerosene which contains 10% by volume isodecanol. The aqueous solution is maintained at a pH of 4 during this extraction. The cobalt is then stripped from the organic extract using the electrolyte solution from the cobalt electrolytic cell to which has been added sufficient HCl to provide a slight excess over the stoichiometric amount of hydrogen needed to replace the cobalt.

The pH of the cobalt-free raffinate is adjusted to a pH of about 4.2 and then contacted with another sample of the same hydroxyquinoline extracting medium as above, in 3 stages, countercurrently, to extract nickel, leaving a nickel-free raffinate. During the extraction, caustic soda solution is added continuously to maintain the required pH.

The organic extract phase, containing the extracted nickel, is stripped of the nickel, using the electrolyte solution from a nickel aqueous electrolysis cell (to which has been added sufficient HCl to replace the nickel in the hydroxyquinoline), countercurrently in a three-stage mixer-settler system. This nickel-free raffinate can then be recycled for use as the slurrying liquid in the reactor, preferably after initially bleeding off a proportion to prevent the buildup of the alkali metal chlorides and alkaline earth metal chlorides. Alternatively the recycled solution can be further evaporated to obtain the remaining portion of the manganese chloride dissolved therein.

EXAMPLE 2

A sample of an ocean floor nodule ore, having the same composition as set forth in Example 1, 335 lbs., dry weight, is again ground to a particle size of not greater than about 30 mesh and admixed with a sample, 94 lbs dry weight, of a chalcopyrite concentrate which is ground to a particle size of less than 100 mesh. The chalcopyrite had a composition comprising 13.8% cuprous sulfide ($Cu_2S$), 30% $CuFeS_2$, 45% $FeS_2$, and 11.2% water and other inerts. The combined, finely ground mixture of solids, is then added to a reactor containing 85 gallons of water. The mixture is stirred to form a suspended slurry. Gaseous, anhydrous hydrogen chloride, 181 lbs total, is added over a period of 2 hours, by being passed into the bottom of the slurry vessel while the stirring of the slurry is continued. Prior to admission of the hydrogen chloride, the slurry had been heated to a temperature of from about 90°–95° C.

After completion of the HCl feed, the leach liquor was separated from the water-insoluble solid residue, and a sample analysed for its metal content. The analysis showed the following composition of the desirable metals in solution:

| METAL | CONCENTRATION (Grams/Liter) |
|---|---|
| Manganese | 112 |
| Copper | 27 |
| Nickel | 4.2 |
| Cobalt | 0.88 |

The analysis found substantially no iron dissolved in the leach solution, thus a leach liquor was obtained containing 78% of the manganese value, 63% of the copper, 73% of the nickel, and 61% of the cobalt present in the combined ores which had been treated in accordance with the present process. Most significantly, there was substantially no evolution of chlorine during this procedure, and substantially no iron was found in the leach solution.

The solution can then be further treated in accordance with the process of Example 1 above.

EXAMPLE 3

The process of Example 2 was repeated, except that 94 lbs. pyrrhotite was substituted for by the chalcopyrite. The pyrrhotite contained 51% iron, 0.82% nickel, 0.32% copper, and 0.017% cobalt. Gaseous anhydrous hydrogen chloride, 134 lbs is added to the slurry over a period of 140 minutes.

A 10 gram sample of the separated leach solution was analysed, and found to contain the following amounts of listed metal values:

| METAL VALUE | Grams/10 Grams Liquid |
|---|---|
| Manganese | 0.53 |
| Copper | 0.028 |
| Nickel | 0.036 |
| Cobalt | 0.004 |

The above analysis shows that 80% of the manganese, 87% of the copper, 86% of the nickel, and 80% of the cobalt present in the combined nodule and pyrrhotite ores are converted to their water-soluble chlorides and dissolved in the leach solution. The leach solution can then be further treated to obtain the individual metal values in accordance with the precedures set forth above in Example 1. There was substantially no iron in the leach solution.

What is claimed is:

1. A method for treating manganese oxide ores including manganese having a valence greater than two, the method comprising contacting the manganese oxide ore in an aqueous slurry with an acid of a hydrogen halide and a sulfide compound selected from the group consisting of hydrogen sulfide and metal sulfides, the sulfide compound being present in at least the stoichiometric amount to react with any acid and manganese oxide being reacted, so as to form sulfur and an aqueous leach solution comprising dissolved manganese salt.

2. A method for treating manganese oxide ores including manganese having a valence greater than two, the method comprising reacting the ore in an aqueous slurry at a temperature of at least about 80° C with an acid of a hydrogen halide, and a sulfide compound selected from the group consisting of hydrogen sulfide and metal sulfides, the sulfide compound being present in at least the stoichiometric amount to react with any acid and manganese oxide being reacted, so as to form sulfur and an aqueous leach solution comprising a dissolved manganese salt.

3. The method in accordance with claim 2, wherein the acid is a hydrogen halide selected from the group consisting of hydrogen chloride, hydrogen bromide and hydrogen iodide.

4. The method in accordance with claim 3, wherein the manganese oxide ore in the slurry has a particle size of not greater than about 10 mesh.

5. The method in accordance with claim 4, wherein the sulfide compound is a metal sulfide compound which has a particle size of not greater than about 10 mesh.

6. The method in accordance with claim 5, wherein the sulfide compound is a metal sulfide ore selected from the group consisting of pyrrhotite, chalcocite, galena, sphalerite, cobaltite, pentlandite, chalcopyrite, and covellite.

7. A method for treating an ocean floor nodule ore, the ore comprising, as major components, oxides of manganese and of iron and as secondary components, compounds of copper, cobalt and nickel, the process comprising the steps of reacting the ore in an aqueous slurry at a temperature of at least about 80° C with an acid, of a hydrogen halide, and a sulfide compound selected from the group consisting of hydrogen sulfide and metal sulfide ores, the sulfide compound being present in at least the stoichiometric amount to react with any acid and manganese oxide being reacted, so as to form sulfur and a hot, aqueous pregnant leach solution comprising dissolved corresponding manganese salt, copper salt, nickel salt and cobalt salt, but substantially free from dissolved iron, and separating the aqueous pregnant leach solution from any solid residue.

8. The method in accordance with claim 7, wherein the acid is a hydrogen halide selected from the group consisting of hydrogen chloride, hydrogen bromide and hydrogen iodide.

9. The method according to claim 8, comprising crystallizing solid manganese halide from the aqueous pregnant leach solution.

10. The method according to claim 9, wherein the hot, pregnant, aqueous leach solution is concentrated in manganese halide and wherein the process further comprises cooling the hot, pregnant leach solution so as to cause the crystallization of a substantial portion of the manganese halide and separating the cooled leach liquor from the crystallized solid manganese halide.

11. The method according to claim 7 wherein the sulfide compound is hydrogen sulfide.

12. The method according to claim 7 wherein the acid is hydrogen chloride.

13. The method according to claim 7 wherein the slurry is at a temperature of at least about 95° C.

14. A method for treating a manganese oxide ore, the manganese oxide ore containing in addition to manganese having a valence greater than two, an iron oxide compound and at least one other nonferrous metal value, the process comprising reacting the manganese oxide ore in an aqueous slurry at a temperature of at least about 80° C with a hydrogen halide selected from the group consisting of hydrogen chloride, hydrogen bromide and hydrogen iodide and a sulfide compound selected from the group consisting of hydrogen sulfide and metal sulfide ores, so as to form sulfur and a pregnant aqueous leach solution comprising the halide of manganese and the halide of the nonferrous metal value, but substantially free from any dissolved iron; separating the aqueous pregnant leach solution from sulfur and the ore residue, which includes the iron; crystallizing solid manganese halide from the pregnant aqueous leach solution, leaving a leach liquor; treating the manganese halide so as to form manganese oxide and the corresponding hydrogen halide; and recycling the hydrogen halide to react with manganese oxide ore and sulfide compound.

15. The method in accordance with claim 14, wherein the sulfide compound is hydrogen sulfide.

16. The method in accordance with claim 14, wherein the sulfide compound is a metal sulfide ore.

17. The method in accordance with claim 14, wherein the leach liquor is treated with a liquid ion exchange agent selective to extract out the nonferrous metal value.

18. A method for treating manganese oxide ores, the ore comprising an oxide of manganese wherein the manganese has a valence of greater than 2, the ore also comprising an oxide of iron, the method comprising reacting at a temperature of at least about 80° C the manganese oxide ore in an aqueous medium with an acid reagent, selected from the group consisting of, hydrogen chloride, hydrogen bromide and hydrogen iodide, and a sulfide material selected from the group consisting of hydrogen sulfide and metal sulfide ores, the sulfide compound being present in at least the stoichiometric amount to react with any acid and manganese oxide being reacted, so as to form elemental sulfur and an aqueous pregnant leach solution comprising dissolved manganese salt, but substantially free from dissolved iron value, and separating the pregnant leach solution from any solid residue of the ore, including the iron value.

19. The method in accordance with claim 18 wherein the sulfide compound is a metal sulfide ore selected from the group consisting of pyrrhotite, chalcocite, galena, sphalerite, cobaltite, pentlandite, chalcopyrite, and covellite.

20. The method in accordance with claim 19 wherein the sulfide compound and the oxide ore has a particle size of not greater than about 10 mesh.

21. A method for treating an ocean floor nodule ore, the ore comprising, as major components, oxides of manganese and of iron and as secondary components, compounds of copper, cobalt and nickel, the process comprising the steps of reacting the ore in an aqueous slurry at a temperature of at least about 80° C with hydrogen chloride and a sulfide compound selected from the group consisting of hydrogen sulfide and metal sulfides, so as to form sulfur and a hot, aqueous pregnant leach solution comprising dissolved manganese chloride, copper chloride, nickel chloride and cobalt chloride, but substantially free from dissolved iron, and separating the aqueous pregnant leach solution from any solid ore residue, including the iron.

22. The method according to claim 21, comprising in addition crystallizing solid manganese halide from the aqueous pregnant leach solution.

23. The method according to claim 22, wherein the hot, pregnant, aqueous leach solution is concentrated in manganese halide and wherein the process further comprises cooling the hot, pregnant leach solution so as to cause the crystallization of a substantial portion of the manganese halide and separating the cooled leach liquor from the crystallized solid manganese halide.

24. The method according to claim 23, comprising in addition contacting the cooled leach liquor with a water-immiscible organic extracting solution comprising an extracting agent selective for copper and selected from the group consisting of alpha-hydroxyoximes and hydrocarbon-substituted-8-hydroxyquinolines, the leach liquor having a pH not greater than about 2.5.

25. The method according to claim 21, wherein the aqueous slurry is at a temperature in the range of from about 95° C up to its boiling point.

26. The method according to claim 25, wherein the aqueous slurry is substantially at its boiling point.

27. The method in accordance with claim 21, wherein the sulfide compound is a metal sulfide ore selected from the group consisting of pyrrhotite, chalcocite, galena, sphalerite, cobaltite, pentlandite, chalcopyrite, and covellite.

28. The method according to claim 21, wherein the sulfide compound is hydrogen sulfide.

29. A method for treating a manganese oxide ore, the manganese oxide ore containing in addition to a primary amount of manganese, an iron oxide compound and a secondary amount of at least one other nonferrous metal value, the process comprising reacting the manganese oxide ore in an aqueous slurry at a temperature of at least about 95° C with hydrogen chloride and a sulfide compound selected from the group consisting of hydrogen sulfide and metal sulfide ores, so as to form sulfur and a pregnant aqueous leach solution comprising manganese chloride and a chloride of the nonferrous metal value, but substantially free from any dissolved iron; separating the aqueous pregnant leach solution from the solid residue, which includes the iron; crystallizing solid manganese chloride from the pregnant aqueous leach solution, leaving a leach liquor; treating the manganese halide so as to form manganese oxide and hydrogen chloride; and recycling the hydrogen chloride to react with manganese oxide ore and sulfide compound.

30. The method in accordance with claim 29, wherein the sulfide compound is hydrogen sulfide.

31. The method according to claim 29, comprising in addition contacting the cooled leach liquor with a water-immiscible organic extracting solution comprising an extracting agent selective for copper and selected from the group consisting of alpha-hydroxyoximes and hydrocarbon-substituted-8-hydroxy quinolines, the leach liquor having a pH not greater than about 2.5.

32. A method for treating manganese oxide ores, the ore comprising an oxide of manganese, wherein the manganese has a valence of greater than 2, the ore also comprising an oxide of iron, the method comprising reacting the manganese oxide ore at a temperature of at least about 80° C in an aqueous medium with hydrogen chloride, and a sulfide material selected from the group consisting of hydrogen sulfide and metal sulfides, the sulfide compound being present in at least the stoichiometric amount to react with any acid and manganese oxide being reacted, so as to form elemental sulfur and a hot, aqueous pregnant leach solution comprising the dissolved corresponding manganese salt, but substantially free from dissolved iron value, and separating the pregnant leach solution from any solid residue of the ore, including the iron value.

33. The method of claim 32 wherein the acid is sulfuric acid.

34. The method of claim 33 comprising in addition, crystallizing solid manganese sulfate from the aqueous pregnant leach solution.

* * * * *

UNITED STATES PATENT AND TRADEMARK OFFICE
Certificate

Patent No. 4,002,717                              Patented January 11, 1977

Richard C. Sandberg, William S. Kane and Paul H. Cardwell

Application having been made by Richard G. Sandberg, William S. Kane, and Paul H. Cardwell the inventors named in the patent above-identified, and Deepsea Ventures, Inc., the assignee, for the issuance of a certificate under the provision of Title 35, Section 256, of the United States Code, deleting the name of William S. Kane as joint inventor, and a showing of proof of facts satisfying the requirements of the said section having been submitted, it is this 14th day of February, 1984, certified that the name of the said William S. Kane is hereby deleted from the said patent as joint inventor with the said Richard G. Sandberg and Paul H. Cardwell.

Fred W. Sherling,
*Associate Solicitor.*